(12) United States Patent
Trifonov et al.

(10) Patent No.: US 7,284,024 B1
(45) Date of Patent: Oct. 16, 2007

(54) QUANTUM NOISE RANDOM NUMBER GENERATOR

(75) Inventors: Alexei Trifonov, Boston, MA (US); Harry Vig, N. Billerka, MA (US)

(73) Assignee: MagiQ Technologies, Inc., New York, NY (US)

( * ) Notice: Subject to any disclaimer, the term of this patent is extended or adjusted under 35 U.S.C. 154(b) by 810 days.

(21) Appl. No.: 10/740,298

(22) Filed: Dec. 18, 2003

Related U.S. Application Data (60) Provisional application No. 60/445,805, filed on Feb. 7, 2003.

(51) Int. Cl.
*G06J 1/00* (2006.01)

(52) U.S. Cl. .......................................... 708/3; 708/256

(58) Field of Classification Search ................ 708/256, 708/3, 801
See application file for complete search history.

(56) References Cited

U.S. PATENT DOCUMENTS

| | | | |
|---|---|---|---|
| 5,987,483 A | 11/1999 | Edelkind et al. | |
| 6,253,223 B1 | 6/2001 | Sprunk | |
| 6,324,558 B1 | 11/2001 | Wilber | |
| 6,393,488 B1 | 5/2002 | Araujo | |
| 6,539,410 B1 | 3/2003 | Klass | |
| 6,609,139 B1 | 8/2003 | Dultz et al. | |
| 2001/0048538 A1* | 12/2001 | Kowalski | 359/136 |
| 2002/0041687 A1* | 4/2002 | Parks et al. | 380/263 |
| 2002/0141694 A1* | 10/2002 | Caplan et al. | 385/24 |
| 2003/0058499 A1* | 3/2003 | Reingand et al. | 359/135 |
| 2003/0058504 A1* | 3/2003 | Cho et al. | 359/161 |
| 2004/0109564 A1* | 6/2004 | Cerf et al. | 380/256 |

FOREIGN PATENT DOCUMENTS

| | | |
|---|---|---|
| JP | 2003167729 | 6/2003 |
| WO | PCT/EP98/08057 | 8/1999 |
| WO | PCT/EP99/03689 | 12/1999 |

OTHER PUBLICATIONS

Yuen, Chan, "Noise in Homodyne and Hetrodyne Detection," vol. 8, No. 3 Optics Letters, Mar. 1983.
Stefanov et al. "Optical Quantum Random Number Generator," J. Mod. Optics vol. 47, No. 4, 595-598 (2000).
Uchida et al. "Single-Electron Random Number Generator (RNG) for Secure Ubiquitous Computing Applications," 0-7803-7462-2/02 IEDM/IEEE (2002), pp. 7.1.1-7.1.4 (pp. 177-180).

* cited by examiner

*Primary Examiner*—Tan V. Mai
(74) *Attorney, Agent, or Firm*—Opticus IP Law PLLC (57) ABSTRACT

A quantum noise random number generator system that employs quantum noise from an optical homodyne detection apparatus is disclosed. The system utilizes the quantum noise generated by splitting a laser light signal using a beamsplitter having four ports, one of which receives one of which is receives the laser light signal, one of which is connected to vacuum, and two of which are optically coupled to photodetectors. Processing electronics process the difference signal derived from subtracting the two photodetector signals to create a random number sequence. Because the difference signal associated with the two photodetectors is truly random, the system is a true random number generator.

7 Claims, 4 Drawing Sheets

QUANTUM NOISE RANDOM NUMBER GENERATOR

CLAIM OF PRIORITY

This patent application claims priority from U.S. Provisional Patent Application No. 60/445,805, filed on Feb. 7, 2003.

FIELD OF THE INVENTION

The present invention relates to random number generation, and in particular relates to systems and methods for generating true random numbers.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in publications by C. H. Bennett et al entitled "Experimental Quantum Cryptography" and by C. H. Bennett entitled "Quantum Cryptography Using Any Two Non-Orthogonal States", Phys. Rev. Lett. 68 3121 (1992).

The above mentioned publications each describe a so-called "one-way" QKD system wherein Alice randomly encodes the polarization or phase of single photons, and Bob randomly measures the polarization or phase of the photons. The one-way system described in the Bennett 1992 paper is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized to within a few tens of nanoseconds during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

The general process for performing QKD is described in the book by Bouwmeester et al., "The Physics of Quantum Information," Springer-Verlag 2001, in Section 2.3, pages 27-33. During the QKD process, Alice uses a random number generator (RNG) to polarization-encode or phase-encode a photon and Bob uses another RNG to randomly select a polarization-basis or phase-basis, as appropriate, to measure Alice's sent photon.

One of the major problems in quantum cryptography is the generation of random numbers to randomly encode the photons. It is desirable that the RNG used be fast and truly random, in contrast to pseudo-randomness used in computer-based RNG's.

For commercial quantum cryptographic systems, the RNG must be simple and cost effective. Further, the underlying physical processes and any associated electronic circuits must be easily analyzed and understood. From this point of view, current optical quantum random number generators are by no means the best possible.

There are a number of prior art RNGs, including some based on single photon detection. However, the latter tend to be expensive and relatively slow (~100 kHz) for the purposes of modern data transmission systems. Likewise, there are currently RNGs based upon noise quantization. These are fast, easy to reproduce and are relatively cheap. However, the problem is in the noise source. Most of the noise sources are based upon a particular type of semiconductor noise, such as Zener diode noise, transistor noise etc. These types of noise are complex in nature, and the mathematical models needed to describe them require a large number of parameters and are not particularly accurate. Further, the effect of aging of semiconductor components on the random generation process is difficult to plausibly test, especially for high-speed output devices.

What is needed therefore is a fast, truly random and relatively simple true random number generator (TRNG) for high-performance systems, such as QKD systems.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

SUMMARY OF THE INVENTION

A first aspect of the invention is a random number generator system that includes a homodyne quantum noise source that generates a random quantum signal. The system also includes processing electronics adapted to receive the random quantum noise signal and generate a sequence random numbers therefrom. In one embodiment, the processing electronics includes a differential transimpedance amplifier (TIA), and an analog-to-digital converter (ADC) coupled to the differential TIA. In another embodiment, the processing electronics includes a subtractor, a TIA coupled to the subtractor, and an ADC coupled to the TIA. In either of these embodiments, the system further includes transformation electronics coupled to the ADC, wherein the transformation electronics are adapted to create a random number sequence from the digital output signal from the ADC.

A second aspect of the invention is a method of generating random numbers. The method includes generating a quantum noise signal using a homodyne quantum noise source, and processing the quantum noise signal with processing electronics to create a sequence of random numbers.

DETAILED DESCRIPTION OF THE INVENTION

The article by Yuen and Chan, entitled "Noise in homodyne and heterodyne detection," Optics Letters, Vol. 8, No. 3, pp. 177-179 (March 1983), which article is incorporated by reference herein, teaches how to eliminate quantum noise and excess noise in homodyne and heterodyne detectors. The article shows that the basic quantum noise in the homodyning and heterodyning signal is a quantum fluctuation and not local-oscillator shot noise.

The present invention utilizes the quantum noise from a homodyne detector as the noise source to create a "continuous noise" TRNG system 10, as described below. Advantages of such a quantum noise source are that the underlying physics are readily understood, and that it can support the fast generation of a sequence of random numbers, since the speed is limited merely by the speed of the photodetectors (e.g., photodiodes) used.

QUANTUM TRNG SYSTEM EMBODIMENTS

First Example Embodiment

Figure 1:
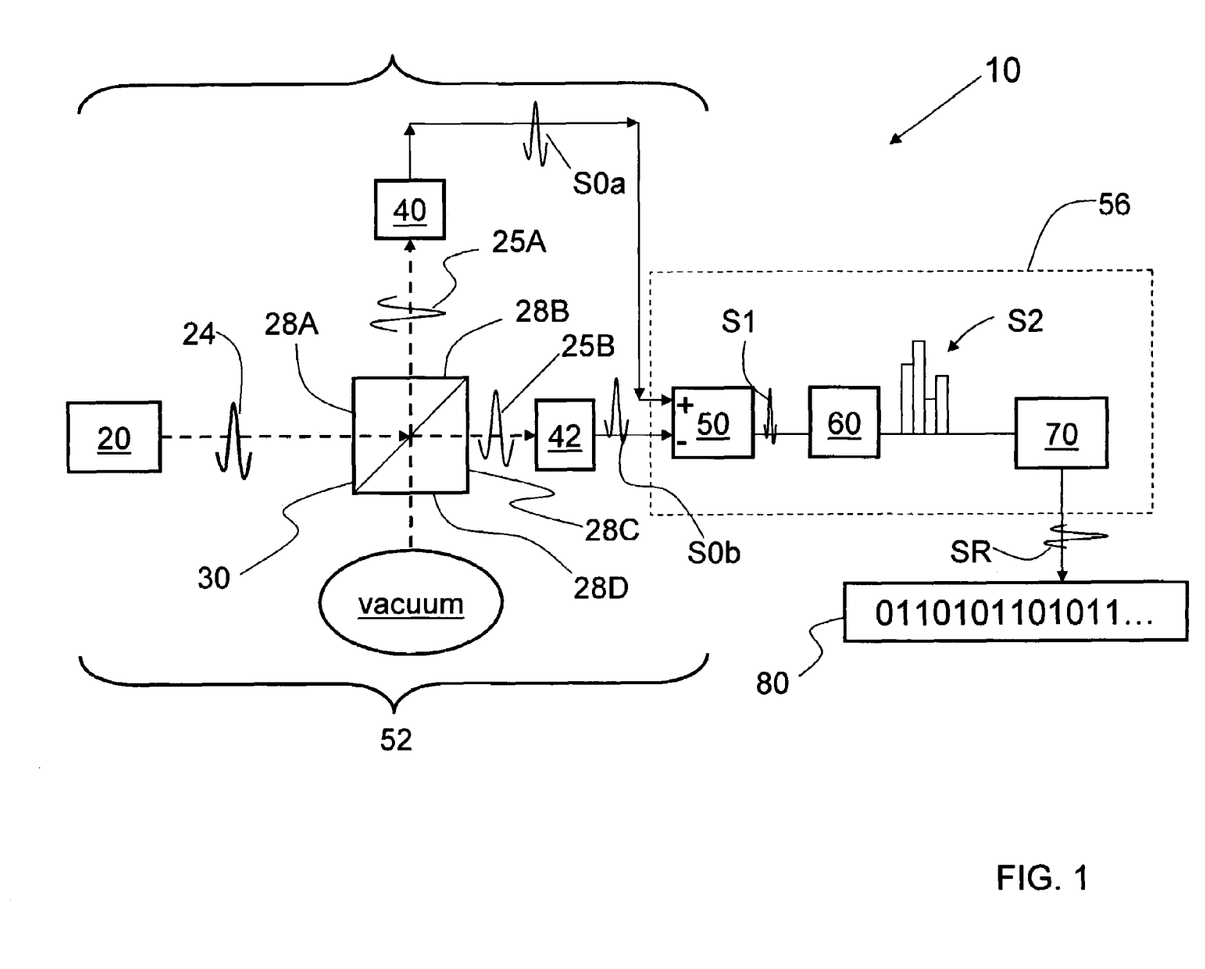
FIG. 1 is a schematic diagram of a first example embodiment of the quantum noise TRNG system of the present invention.

FIG. 1 is a schematic diagram of a first example embodiment a quantum-noise TRNG system 10 according to the present invention. System 10 includes a laser source 20 adapted to emit a light signal 24, which may be a continuous beam or pulses of light. System 10 also includes a 50/50 beamsplitter 30 that has four ports 28A, 28B, 28C and 28D. Beamsplitter 30 is arranged to receive light signal 24 at port 28A. System 10 also includes two photodetectors (e.g., photodiodes) 40 and 42 respectively arranged so as to be in optical communication with corresponding ports 28B and 28C. Port 28D is "open" or "dark," meaning that the port is subject to vacuum fluctuations. Port 28D is thus shown as connected to a vacuum.

Photodetectors 40 and 42 are electrically connected to a differential transimpedance amplifier (TIA) 50. The laser source 20, beamsplitter 30, detectors 40 and 42 and the differential TIA 50 constitute a homodyne quantum noise source 52.

In the example embodiment illustrated in FIG. 1, processing electronics 56 includes differential TIA 50, which is electrically connected to an analog-to-digital converter (ADC) 60, which in turn is electrically connected to transformation electronics 70. In an example embodiment, transformation electronics 70 includes a comparator or a digitizer, which compares the voltage it receives to select voltage values to create a random number sequence 80. Other examples of transformation electronics 70 include a digital entropy expansion circuit and a bit-interleaving circuit.

Note that in the present example embodiment the differential TIA 50 is "shared" between the homodyne quantum noise source 52 and the processing electronics 56.

With continuing reference to FIG. 1, in the operation of TRNG system 10, laser source 20 emits light signal 24. As mentioned above, light signal 24 may be pulses of light or a continuous beam. Further, light signal 24 can be a multiple-photon beam or multi-photon pulses. Light signal 24 enters beamsplitter 30 at port 28A, whereupon it is split into two (substantially) equal light signals 25A and 25B. Light signal 25A exits beamsplitter 30 at port 28B and is detected by photodetector 40. Likewise, light signal 25B exits beamsplitter 30 at port 28C and is detected by photodetector 42. Photodetectors 40 and 42 generate corresponding (analog) photocurrent signals S0$a$ and S0$b$ in response to detecting light signals 25A and 25B.

Photocurrent signals 25A and 25B are received by differential TIA 50, which subtracts one photocurrent signal from the other and creates an (analog) voltage difference noise signal S1. The difference noise signal corresponds to the shot noise level of the light signal ("field") 24 incident on beamsplitter 30 at port 28A.

Signal S1 proceeds to ADC 60, which converts this signal into an amplified digital voltage difference (noise) signal S2. Signal S2 from ADC 60 is then passed to transformation electronics 70, which performs a mathematical transformation on signal S2 to create a random number signal SR corresponding to a sequence of random numbers 80 having a select range in any one of a number of bases, e.g., binary (0 and 1).

The mean number of photons in light signals 25A and 25B leaving respective output ports 28B and 28C is determined by the transmittance and reflectance of beamsplitter 30. As a result of a random Poissonian splitting process, fluctuations are introduced. Thus, for output port 28B and 28C of beamsplitter 30, the light noise comprises the input field noise and Poisson noise caused by the beamsplitting process. The additional splitting noise is anti-correlated for the two output ports 28B and 28C. Transmission of one extra photon by the beamsplitter (positive fluctuation) means the absence of one photon in the reflected beam (negative fluctuation).

In the case of ideal quantum efficiency of photodetectors 40 and 42, subtraction of photocurrents S0$a$ and S0$b$ by the differential TIA 50 means subtraction of an initial field noise and the summation of two components of the additional splitting noise. The difference signal S1 between photocurrent signals S0$a$ and S0$b$ from detectors 40 and 42 contains the splitting noise introduced by the beamsplitter. This is equivalent to the shot noise level of the input field of initial input light beam 24.

As previously mentioned, vacuum fluctuations are applied to the open port 28D of beamsplitter 30. Thus, the photocurrent difference noise is determined by vacuum fluctuations and is equal to the standard quantum limit for the field applied to beamsplitter port 28A. Vacuum fluctuations are mixed at the beamsplitter with the input photon flux of light signal 24. The vacuum field does not alter the total number of photons, which is why the mean number of photons in the overall photon flux in light signals 25A and 25B is equal to the mean number of photons in incident light signal 24.

In addition, since a $\pi$ phase shift is introduced by the beamsplitter to the fields associated with light signals 25A and 25B, vacuum fluctuations at the beamsplitter outputs are anti-correlated and are finally mutually eliminated within the overall photon flux. Although vacuum field fluctuations are small enough, they still interact with the strong macroscopic field of the input photon flux of input signal 24. This leads to the appearance of shot noise in signal S1 due to the difference in photon flux between light signals 25A and 25B.

It is important to note that the shot noise coming out of differential TIA 50 does not depend on the noise in laser source 20. Instead, the noise depends on the quantum efficiency of the photodiodes, which is independent of the semiconductor noise.

Second Example Embodiment

Figure 2:
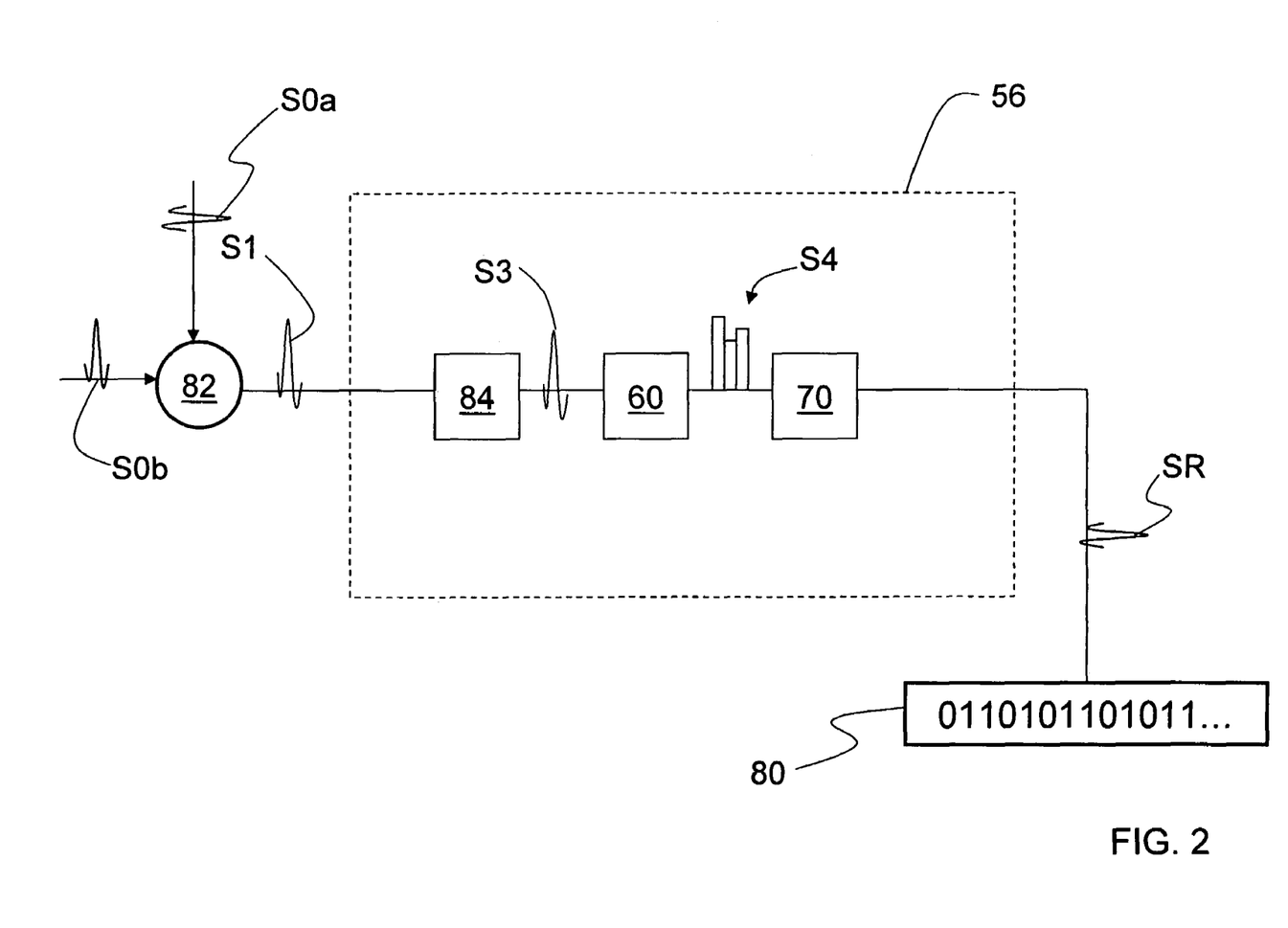
FIG. 2 is a close-up schematic diagram of the processing electronics associated with a second example embodiment of TRNG system of the present invention.

FIG. 2 is a close-up schematic diagram of the processing electronics 56 associated with a second example embodiment of system 10. In this second embodiment, photodetectors 40 and 42 (FIG. 1) are electrically connected to a subtractor 82. As the term is used herein, "subtractor" means any device that can receive two signals and subtract one from the other to create a difference signal. The laser source 20, beamsplitter 30, detectors 40 and 42 and subtractor 82 constitute homodyne quantum noise source 52.

Subtractor 82 is electrically connected to processing electronics 56, which includes electrically coupled to one another in sequence a TIA 84, an ADC 60 and transformation electronics 70. Thus, subtractor 82 and TIA 84 function much in the same manner as the single differential TIA 50, though the single differential TIA embodiment typically provides for better bandwidth and better immunity to external noise.

In the operation of the second embodiment of system 10, subtractor 82 receives photocurrent signals S0a and S0b from photodetectors 40 and 42, respectively, and subtracts the two signals to form analog current difference signal S1. TIA 84 then receives and converts signal S1 into an analog voltage difference signal S3, and ADC 60 converts signal S3 into digital voltage difference signal S4. Thus, signal S4 is essentially the same as signal S2 of FIG. 1. Random number signal SR and random number sequence 80 are then generated as described above in connection with the first embodiment.

Third Example Embodiment

Figure 3:
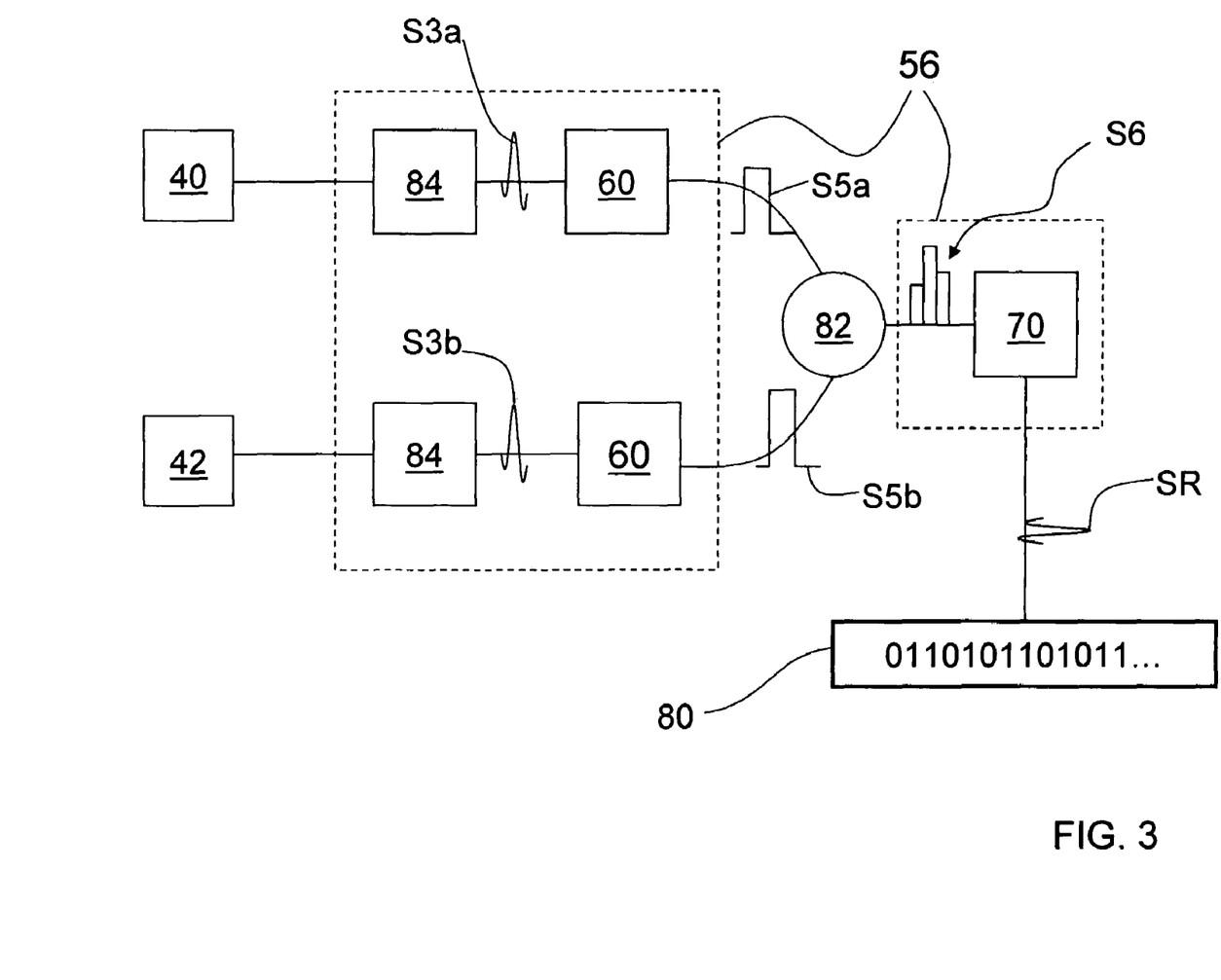
FIG. 3 is a close-up schematic diagram of the processing electronics associated with a third example embodiment of the TRNG system of the present invention.

FIG. 3 is a close-up schematic diagram of the processing electronics 56 associated with a second example embodiment of system 10. Processing electronics 56 includes a TIA 84 and an ADC 60 between detector 40 and subtractor 82, and a TIA 84 and ADC 60 between detector 42 and subtractor 82. This third embodiment operates in a manner similar to that of the system of FIG. 2, except that the placement of TIAs 84 and ADCs 60 result in the creation of respective analog voltage signals S3a and S3b ("analog photovoltages") from TIAs 84 and respective digital voltage signals S5a and S5b ("digital photovoltages") from ADTs 60. Signals S5a and S5b are then digitally subtracted at subtractor 82. This produces a digital voltage difference signal S6, which is received and processed by transformation electronics 70 to create random number signal SR corresponding to random number sequence 80.

QKD System

Figure 4:
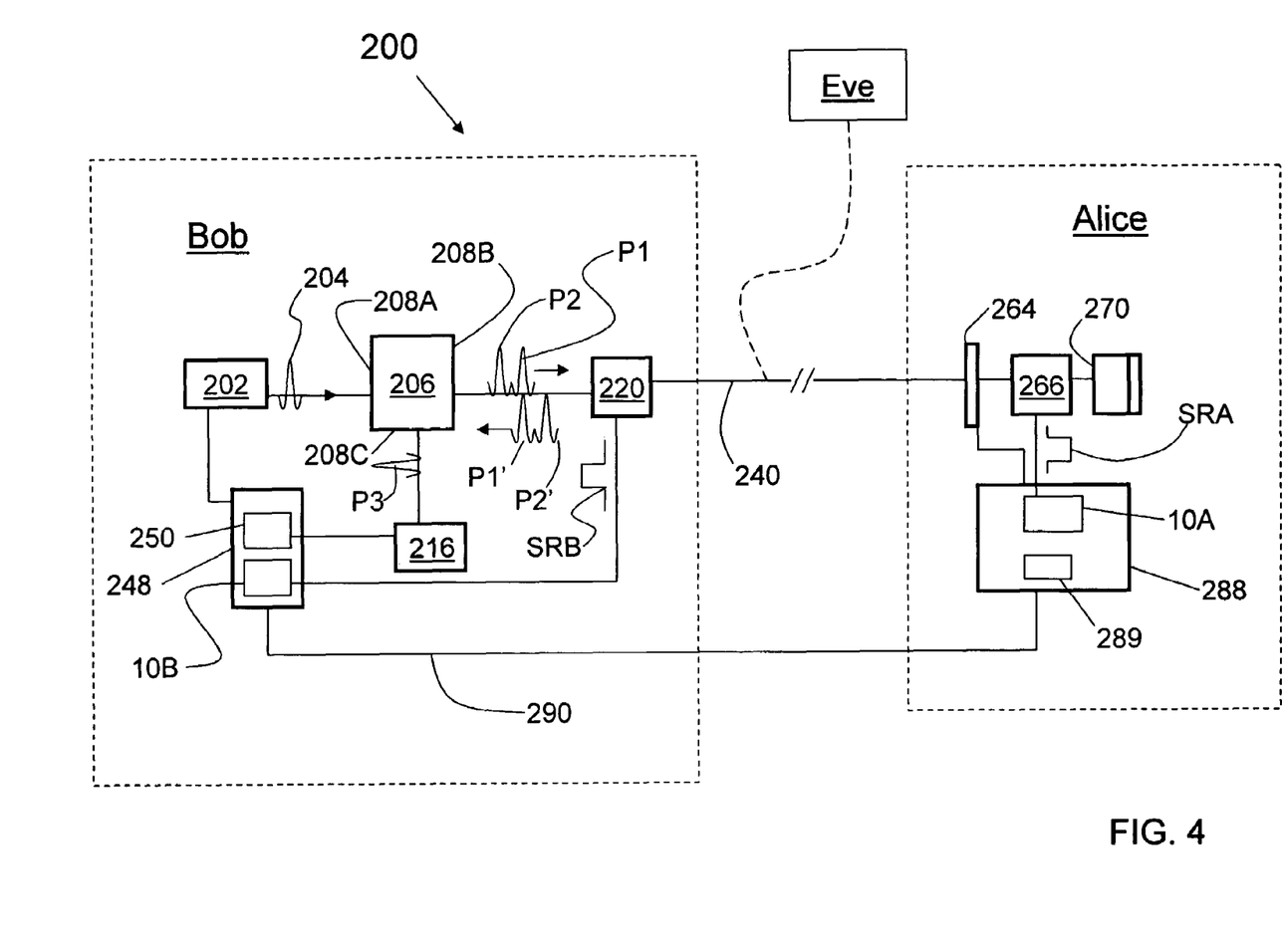
FIG. 4 is a schematic diagram of a two-way QKD system having QKD stations Alice and Bob each having a controller with the quantum noise TRNG according to the present invention.

FIG. 4 is a schematic diagram of an example embodiment of a folded QKD system 200 that includes two TRNG systems 10 (i.e., 10A and 10B) of the present invention. System 200 includes two key encoding stations: a transmitting/receiving station Bob and a reflecting station Alice, referred to hereinafter simply as "Bob" and "Alice." A two-way system is described in connection with TRNG systems 10A and 10B for the sake of convenience. However, the TRNG system of the present invention is applicable to any QKD system (e.g., two-way or one-way) that requires one or more high-speed, cost-effective TRNGs.

The TRNG system of the present invention is discussed in connection with a QKD system because it is particularly well suited for such systems. However, such discussion is not intended to be limiting, and in fact the TRNG system of the present invention is applicable to any number of situations, processes and systems that call for true, fast random number generation.

Bob

With continuing reference to FIG. 4, Bob includes a laser 202 that emits light pulses 204. Laser 202 is coupled to a time-multiplexing/demultiplexing optical system 206 having an input end 208A, an input/output end 208B, and a detector output end 208C. Optical system 206 receives input pulses 204 at input end 208A, splits each pulse into two time-multiplexed pulses P1 and P2 and outputs them at input/output end 208B. Likewise, optical system 206 also receives optical pulses at input/output end 208B, as described below.

A single-photon detector 216 is coupled to optical system 206 at detector output end 208C. A phase modulator (PM) 220 is coupled (e.g., by an optical fiber) to optical system input/output end 208B. An optical fiber 240 connects Bob to Alice at PM 220.

Bob also includes a controller 248 operatively (e.g., electrically) coupled to laser 202, detector 216, and PM 220 to control the operation of these elements, as described below. In an example embodiment, controller 248 includes a programmable computer capable of performing instructions (e.g., "software") stored on a computer-readable medium 250. In an example embodiment, the instructions stored on the computer-readable medium 250 include methods according to the present invention as described below.

Controller 248 also includes a TRNG system 10B operably connected to PM 220 so that random numbers generated by TRNG system 10B in a corresponding output signal SRB are used to randomly set the phase of PM 220, e.g., by randomly selecting a phase from a set of allowable phases.

Alice

Alice includes a variable optical attenuator (VOA) 264 connected to optical fiber 240. A phase modulator (PM) 266 is arranged downstream of and is optically coupled to VOA 264. A Faraday mirror 270 is arranged downstream of and is optically coupled to PM 266.

Alice also includes a controller 288 operatively (e.g., electrically) coupled to PM 266 and VOA 264. In an example embodiment, controller 288 includes a programmable computer capable of performing instructions (e.g., "software") stored on a computer-readable medium 289. In an example embodiment, the instructions stored on the computer-readable medium 289 include methods according to the present invention as described below.

Controller 288 also include a TRNG system 10A operably connected to PM 266 so that random numbers generated by TRNG system 10A in a corresponding output signal SRA are used to randomly set the phase of PM 266.

Controllers 248 and 288 are linked (e.g., electrically or optically) via link 290 to synchronize the operation of Alice and Bob. In particular, the operation of the phase modulators 220 and 266, and detector 216 are controlled and coordinated by controllers 248 and 288 relative to the launched optical pulse 204 using corresponding gating signals when exchanging a quantum key between Alice and Bob. Thus, in an example embodiment, controllers 248 and 288 can be considered as constituting a single controller for the QKD system.

QKD System Operation

With continuing reference to FIG. 4, in the operation of system 200, pulse 204 is divided into two separate pulses P1 and P2 by time-multiplexing/demultiplexing optical system 206. In the present example embodiment, pulses P1 and P2 are relatively weak pulses The pulses are passed out of optical system input/output end 208B to PM 220, which is gated to allow the pulses to pass therethrough unmodulated. Pulses P1 and P2 then pass to Alice over optical fiber 240. Pulses P1 and P2 continue to VOA 264, which can attenuate the pulses if necessary. The pulses then pass through PM 266 and are reflected by Faraday mirror 270, and then pass back through PM 266 a second time.

During one of the passes of pulses P1 and P2 through PM 266, the PM randomly modulates one of the pulses—say, pulse P1—via random number signal SA to form a phase-modulated pulse P1'. This is achieved by controller 288 sending a well-timed gating signal that activates PM 266 for the short period of time (i.e., less than the time-separation between the pulses) when pulse P1 passes through PM 266. Pulses P1 and P2 then pass back through VOA 264, which can attenuate the pulses if necessary. The pulses then pass back to Bob and to PM 220 therein. PM 220 is then directed to randomly modulate the remaining unmodulated pulse—in this case, pulse P2—with one of the select phase modulation values based on random number signal SB. This is achieved by controller 248 providing a well-time gating signal to PM 220 that activates the phase modulator during the short time period within which pulse P2 passes through PM 220.

Now-modulated pulses P1' and P2' (the latter is not shown in FIG. 4) continue on to optical system 206. Optical system 206 combines the pulses to form a combined pulse P3, which is directed out of detector output end 208C to detector 216. Detector 216 receives combined pulse P3 and outputs a signal to controller 248 that corresponds to the relative phases imparted to pulses P1 and P2 by PM's 266 and 206, respectively.

Once a desired number of pulses are exchanged, the key is derived using known techniques—for example, by Alice and Bob publicly comparing the basis of their measurements and only keeping the measurements (bits) corresponding to the same measurement basis. This forms the sifted key. They then choose a subset of the remaining bits to test for the presence of an eavesdropper Eve and then discard these bits. The act of eavesdropping on optical fiber 240 by Eve intercepting or otherwise attempting to measure the weak optical pulses being transmitted between Bob and Alice will necessarily introduce errors in the key due to the quantum nature of the photons being exchanged. If there are no errors in the sifted key due to the presence of an eavesdropper Eve, then the transmission is considered secure, and the quantum key is established.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A random number generator system comprising:
a homodyne quantum noise source that generates a random quantum signal;
processing electronics adapted to receive the random quantum noise signal and generate a sequence of random numbers therefrom, said processing electronics including a differential transimpedance amplifier (TIA) adapted to receive a noise signal from the homodyne quantum noise source and create an analog voltage difference signal; an analog-to-digital converter (ADC) coupled to the differential TIA and adapted to receive the analog voltage difference signal and create a digital voltage difference signal; and transformation electronics coupled to the ADC and adapted to receive the digital voltage difference signal and generate therefrom a sequence of random numbers.

2. A random number generator comprising:
a laser source adapted to emit a first light signal;
a beamsplitter having first through fourth ports and arranged to receive the light signal at the first port, and wherein the fourth port is connected to a vacuum;
first and second detectors respectively optically coupled to the second and third ports so as to receive one of respective second and third light signals formed by the beamsplitter splitting the first laser signal into second and third substantially equal light signals, wherein the first and second detectors respectively generate first and second photocurrents in response to detecting said second and third light signals;
a subtractor arranged to receive the first and second photocurrents and perform a subtraction of the two signals to generate an analog current difference noise signal;
processing electronics adapted to receive the analog difference noise signal and generate a sequence of random numbers, said processing electronics including a transimpedance amplifier (TIA) adapted to receive the analog current difference noise signal from the subtractor and create an analog voltage difference signal; an analog-to-digital converter (ADC) coupled to the TIA and adapted to receive the analog voltage difference signal and create a digital voltage difference signal; and transformation electronics coupled to the ADC and adapted to receive the digital voltage difference signal and generate a sequence of random numbers.

3. A method of generating a sequence of random numbers, comprising:
generating a quantum noise signal using a homodyne quantum noise source by splitting a first light signal with a 50/50 beamsplitter into second and third light signals and detecting the second and third light signals with respective first and second photodetectors; generating respective first and second photocurrents corresponding to the photodetected second and third light signals; and determining the difference between the first and second photocurrents; and
processing the quantum noise signal with processing electronics to create a sequence of random numbers, wherein said processing includes using a differential transimpedance amplifier to take the difference between the first and second photocurrents and produce a corresponding analog voltage difference signal; receiving the analog voltage difference signal with an analog-to-digital converter (ADC) and generating a corresponding digital voltage difference signal; and transforming the digital voltage difference to create the sequence of random numbers.

4. The method of claim 3, including comparing the digital voltage difference signal to select voltages to create a random signal representative of the sequence of random numbers.

5. A key encoding station for a quantum key distribution (QKD) system, comprising:
 a phase modulator;
 a random number generator comprising a homodyne quantum noise source that generates a random quantum signal, and processing electronics adapted to receive the random quantum noise signal and generate a sequence random numbers therefrom, wherein the random number generator is operably coupled to the phase modulator so as to randomly set the phase of the phase modulator from a set of select phase modulations using the sequence of random numbers; and
 a controller operably coupled to the phase modulator to gate the operation of the phase modulator in combination with randomly setting the phase of the phase modulator.

6. The key encoding station of claim 5, further including a laser source for generating a light signal that is randomly modulated by the phase modulator.

7. The key encoding station of claim 5, wherein said processing electronics includes:
 a differential transimpedance amplifier (TIA) adapted to receive the random quantum noise signal from the homodyne quantum noise source and create an analog voltage difference signal;
 an analog-to-digital converter (ADC) coupled to the differential TIA and adapted to receive the analog voltage difference signal and create therefrom a digital voltage difference signal; and
 transformation electronics coupled to the ADC and adapted to receive the digital voltage difference signal and generate said sequence of random numbers.

\* \* \* \* \*

UNITED STATES PATENT AND TRADEMARK OFFICE
CERTIFICATE OF CORRECTION

| | | |
|---|---|---|
| PATENT NO. | : 7,284,024 B1 | |
| APPLICATION NO. | : 10/740298 | |
| DATED | : October 16, 2007 | |
| INVENTOR(S) | : Alexei Trifonov and Harry N. Vig | |

It is certified that error appears in the above-identified patent and that said Letters Patent is hereby corrected as shown below:

In lines 5 and 6 in Item [57] ABSTRACT, delete the phrase "one of which is receives"

Signed and Sealed this

Eighteenth Day of December, 2007

JON W. DUDAS
*Director of the United States Patent and Trademark Office*